Dec. 1, 1942.  O. W. FISHER ET AL  2,303,448
WHEAT PRODUCT AND THE PROCESS OF MAKING THE SAME
Filed June 27, 1939
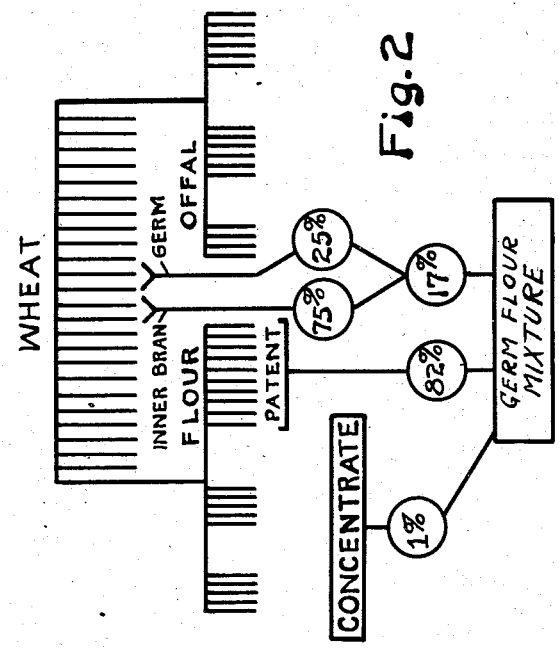
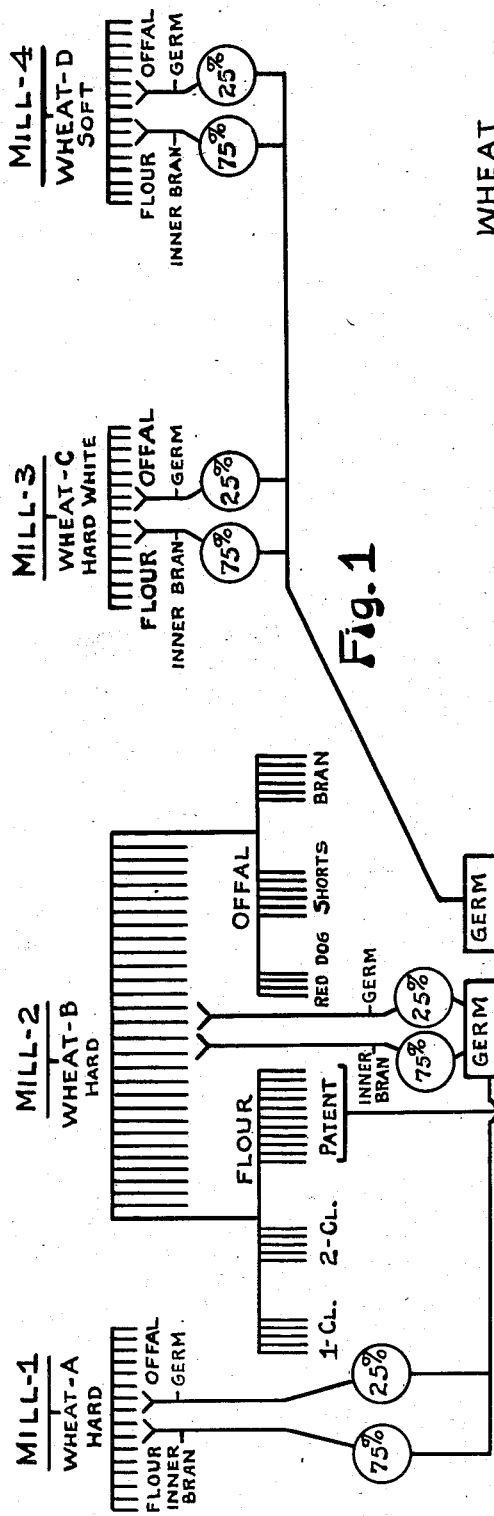
INVENTORS
ORIN WALLACE FISHER
WILLIAM L. HALEY
ARTHUR J. KING
BY
ATTORNEY Patented Dec. 1, 1942

2,303,448

UNITED STATES PATENT OFFICE 2,303,448

WHEAT PRODUCT AND THE PROCESS OF MAKING THE SAME

Orin Wallace Fisher, William L. Haley, and Arthur J. King, Seattle, Wash., assignors to Fisher Flouring Mills Co., Seattle, Wash., a corporation of Washington Application June 27, 1939, Serial No. 281,402

3 Claims. (Cl. 99—153)

Our invention relates to the art of a new wheat product for making bread and the like, and the process of making the same.

While it is recognized, first, that wheat flour in bread supplies several minerals important in the human diet, and second, that the wheat germ is a portion of the wheat particularly rich in such minerals and vitamins B, E and G, nevertheless, the common milling practice is to remove such wheat germ, together with even the fine bran, because the retention of these portions of the wheat introduces factors which operate, among other matters, against the providing of proper baking and keeping qualities of the milled product. In our invention we go contrary to the common milling practice above described and include in our ground wheat product the wheat germ and the fine bran and at the same time eliminate the factors which operate against the providing of proper baking and keeping qualities of the milled product.

It is a primary purpose to provide an article of manufacture, such as bread or the like prepared from the wheat product of our invention or discovery characterized in having a greatly augmented nutritive value—one wherein the mineral and vitamin content greatly exceeds that normally obtaining in bread or like products. It is one of our primary purposes to augment the wheat germ and bran portions of the wheat flour in forming our wheat product invention and at the same time overcome the difficulties, which arise from said added materials. Our discovery takes into account the increased enzymatic activity due to the added portion (germ and inner bran) of the wheat kernel which otherwise would operate against the meeting of the standard requirements of the milling and baking art, and we have discovered how to subject the same to proper control.

Our discovery involves the adding of wheat germ to the wheat flour in a percentage which renders the germ content of our wheat product greater than it would be in the wheat which would be required to make the corresponding amount of wheat flour. Remembering that approximately 25 to 30% of the wheat kernel is discarded as offal, leaving only 75 to 70% as endosperm or white flour, it is manifest that our invention relates to increasing the germ content of the wheat product of our invention above the germ content that would be there if the 25 to 30% offal were not discarded but were retained with the 75 to 70% endosperm flour. Also our discovery further involves the adding of the inner (and only the inner) portion of the bran part of the wheat. The wheat product of our invention or discovery, which includes the added wheat germ and bran portion, is suitable for baking bread and the like, i. e., besides bread it is suitable for rolls, pancakes, crackers, doughnuts, pie crust, coffee cakes, and all types of leaven goods.

It is important to know in general something of the nature of the wheat kernel and some of the principles of the milling of flour and the requirements for baking properties to understand our invention or discovery.

Wheat occupies the position of greatest importance on the list of foods derived from plants. The history of milling wheat closely parallels the progress of civilization. Wheat is the only known grain from which flour can be made which, when mixed with water, will produce a sufficient amount of that tenacious, elastic material called "gluten," necessary to the production of a light loaf of bread. Some wheats are planted in the fall of the year. They sprout and grow a little during the warm fall weather, then mature the following summer. These are called "winter wheats." Other wheats are planted in the spring and grow to maturity in the summer. These are called "spring wheats." The best flour is usually made from wheats that mature during hot, dry weather.

Bread wheat consists primarily of two species—common wheats, some hard and some soft, and club wheats, usually soft—although there are many different varieties of each specie. The same varieties when grown under different conditions of soil, climate and moisture produce flours of different bread-making characteristics. These many variations in the quality of wheats make necessary the highly developed systems of testing and blending in order to produce uniform flours for bread making and other purposes.

A kernel of wheat yields several mill products: First, the offal, which ordinarily amounts, under conditions of commercial milling, to about 25-30 percent of the grain, and comprises—(1) bran, which is the coarse flaky particles of the seed coating, (2) shorts, made up of fine bran, germ meal, etc., and (3) red dog, more floury, but still containing much of the fibrous material from the outer layers of the wheat berry; second, the wheat flour, which represents, under conditions of commercial milling, about 75 to 70% of the grain, is formed of (1) second clear, which is the low grade flour obtained from the layers of cells next to the seed coat, (2) first clear, which is a higher grade of flour coming principally from the aleurone cells and the outer endosperm, and (3) patent flour, which is made only from the highly refined and purified endosperm, or inner portion of the wheat kernel.

Flour milling is almost entirely a mechanical process. Fundamentally it consists of three steps: (1) the selection, cleaning, conditioning and blending of the proper wheats; (2) rolling or grinding to the required fineness; and (3) the separating of the fibrous outer covering from the inner portion, or white, floury center of the wheat kernel. The actual manufacturing process, however, is very much involved and is not by any means as simple as the three steps might indicate.

Flours are often milled from a mixture of several wheats after cleaning, which is accomplished by repeated use of various screens and separators to remove foreign seed, straws, sticks, and sand; by passing through currents of air to remove dust and chaff, and over magnetic separators to remove bits of metal, and finally by washing in clean pure water.

Bakery flours are usually milled from a particular variety of wheat, the variety chosen depending on the type of flour desired. Family flours, or all-purpose flours, are usually milled from a select variety of wheat, or a wheat mixture made by blending several varieties, each variety being chosen for the particular baking characteristics which it imparts to the finished flour. Flours may be made from a blend of wheats, or from a blend of flours by using all or a part of the flour obtained from one wheat mixture, and by blending this with flour obtained from other wheat mixtures.

After being thoroughly cleaned and properly conditioned by exposure to water, the wheat is passed between corrugated steel rolls that revolve at slightly different speeds, to produce the breaking or crushing effect upon the grain. From each pair of rolls the broken grain or "stock," as it is called, passes through sifters which remove whatever flour has been liberated, while the coarser particles are classified according to size and returned to other rolls, where the process is repeated again and again until all the inner portion (endosperm) has been removed, leaving only the bran. After the endosperm has been separated from the bran, this stock is further "reduced" by passing between smooth steel rolls, and "purified" by passing through silk bolting cloths over a current of air which lifts out any light bran particles that may have escaped the sifting operations. Little streams of flour are obtained after practically every grinding and separating operation. Each of these streams, coming from different steps in the milling process, has slightly different baking characteristics and, hence, the experienced miller can, by selecting various streams, produce many different qualities of flour from one wheat mixture. When only the best streams are taken, the resulting flour is known as a "short patent." If all the streams are run together, the flour is known as a "straight" or 100 percent flour. Patent flours are usually whiter in color than straights.

From the above it is manifest that one of the objects of the milling operations is to obtain the finely ground endosperm freed of all parts of the kernel such as the bran and the germ. In general, the resulting product is also referred to as "white flour." This germ portion contains an oil and said portion is high in ash content and is of a very yellow color, and for these several reasons it has always been deemed necessary to eliminate said germ portion from the best flour. A fundamental feature of our discovery and invention resides in our going directly contrary to this common practice of the art of eliminating the wheat germ from the final flour, and at the same time our discovery comprises providing a wheat product which will be characterized by meeting the requirements for baking properties which have become standard by long experience and custom.

The best baking properties of the flour are present when the endosperm content is maximum and the bran is absent or reduced to a minimum, according to the experience and teaching of the milling art heretofore. The purer the endosperm, i. e., the freer it is of bran and germ, the better in quality, it has been thought, is the resulting product. In milling, those stocks containing the wheat germ have been found by experience to be more subject to becoming infested and present a special difficulty in keeping the same free of infestation. It is possible to make flour less susceptible to infestation because only the endosperm cells are retained, since a finer sieve may be employed and thereby prevent even the smallest insect eggs from passing into the flour. Since a portion of our product is comparatively coarse, the normal method of preventing infestation was not applicable and this presented a further difficulty in providing a commercially practical wheat product, such as constitutes our invention. We overcame this difficulty by using extreme methods of infestation elimination, as by fumigating and cleaning the milling equipment at intervals of such shortness as is not at all considered necessary in ordinary milling operations. The process of our invention renders the product of our invention as sterile as white flour.

The baking properties of course also depend upon the quality of the wheat. Wheat will vary even from the same localities with different seasons, and will also vary with different soils and climatic conditions for the particular varieties of grain. In ordinary milling, it is recognized and established (1) that putting back into the flour the wheat germ deteriorates or impairs the baking properties, and (2) likewise the adding of the bran deteriorates or impairs the baking properties. Our invention provides for the adding of both of these parts of the grain, i. e., the germ and the bran as herein set forth, and at the same time provides for not impairing or deteriorating the baking properties, but gives an improved product along other lines as herein set forth, including uniformity of baking results. Several months of commercial experience covering the varying climatic conditions of the Pacific Coast States has demonstrated a most remarkable uniformity in the baking results or properties of the wheat product constituting our invention. Among other properties characterizing our product are those of a better taste or flavor, a better texture and greatly increased nutritive value.

One of the exacting requirements for suitable baking properties of a wheat product relates to the character of the loaf resulting from using the product in baking. A bold, well-risen loaf of proper volume for the weight is essential, i. e., it must have the proper degree of lightness per volume when baked. The top of the loaf should be convex, as opposed to a concave top, for loaves other than sandwich, salt-rising and like special types of bread. Other qualities besides volume of a standard loaf of bread are: proper texture, crumb and crust color, and absence of large holes. An object of our invention and discovery is to provide a loaf which provides for characteristics in all respects equal to that attained by using white flour in the production of an open top loaf, as well as additional qualities and features hereinafter set forth. Among these additional advantages or qualities may be named the following: An improved flavor, and a greatly improved flavored toast—toasting seems to bring out the flavor in the loaf made with our newly discovered wheat product. The loaf made from our wheat product contains much more of the natural vitamins and minerals, i. e., the vitamins and minerals are present in a percentage far in excess of any white bread, and more than in whole wheat bread, and at the same time does not contain the rough fibrous bran that is found in whole wheat bread. The wheat product of our discovery does not prove irritating to the stomach or intestines, because there is present only the inner or less fibrous bran part of the grain. Furthermore, the loaf made from the product of our discovery has better keeping qualities than bread as heretofore made, i. e., it will keep its freshness longer.

For example, many bakers with an increasing volume of sale of bread produced from our wheat product are finding it unnecessary to bake every day because of this quality of keeping unusually fresh. Let it be noted that a loaf of bread may have a "keeping" quality but this does not mean it will keep "fresh," i. e., keep from becoming what is sometimes referred to as "stale." It is this feature of greatly extended period of remaining "fresh" that we wish to point out as characterizing the loaf formed with our wheat product.

It is generally accepted that white flour should be allowed to age a certain period of time before it is used. Our invention provides for our product to comply with this requirement, and at the same time for the germ portion to be relatively fresh. In milled products, as heretofore manufactured, all constituent elements were substantially of the same age. However, one of the conditions which had to be faced in providing the wheat product constituting our invention was that one part had to be aged, while the other had to be fresh. This we have accomplished in our product.

Another object of our invention is to provide a wheat product which will make provision for the proper fermentation tolerance as required by the baking trade.

In general, our invention and discovery relates to providing a wheat product comprising the following materials and these preferably in the optimum percentage indicated:

(a) 82% of wheat flour (preferably a patent flour)

(b) 17% of a mixture comprising 75% inner bran and 25% raw wheat germ; and (c) 1% of a mixture referred to herein as "concentrate" of 94.7% patent flour, 0.3% potassium bromate, and 5.0% malted wheat flour.

The wheat flour is preferably a blend from a plurality of flours, and is preferably aged. Likewise the inner bran and wheat germ preferably are blends from a plurality of mills operating on different grains. This provides the ideal combination to insure most desirable flavor.

Referring to the drawing:

Figure 1 represents a diagrammatic sketch of four separate mill units for grinding different types of wheat at the same time, selected portions of the product of which milling operation are combined with the "concentrate," to form the wheat product of our discovery or invention; and Fig. 2 illustrates the milling process when only one milling unit is available.

Mills 1, 2, 3 and 4 are operating respectively upon four different wheats. The milling operation first results in dividing the broken wheat into flour and offal. The flour is divided into first clear, second clear and patent flour. The offal is divided into red dog, shorts, and bran, with a portion of the germ separated. The patent flour is taken from mill #2, and, after ageing, 82% is intermixed with the other ingredients of our wheat product. The inner bran to the extent of 75% is mixed with 25% of the germ to form the mixture, styled herein "germ meal" from hard wheats. This same operation occurs with respect to the inner bran and germ portions of the grain from the other mills operating upon soft wheats, and/or hard white wheats.

A mixture styled herein, germ meal mixture, is next formed of one third of the germ meal from the hard wheat and two thirds from hard white and soft wheat. Of this germ meal mixture, 17% for optimum results is added to the 82% of the wheat flour, 82% being for the optimum results, and to this combination of the wheat flour and germ meal mixture, there is added "concentrate" to the extent of 1% for optimum results. Each of these ingredients, flour, germ meal, germ meal mixture and concentrate will now be set forth separately as to their percentages, etc., as follows:

*Flour*

Wheat flour specially matured and aged:

| | Per cent |
|---|---|
| Optimum percent in germ flour mixture | 82 |
| Minimum percent in germ flour mixture | 75 |
| Maximum percent in germ flour mixture | 95 |

*Germ meal*

Selected stocks of inner bran, and germ:

| | |
|---|---|
| Optimum percent of germ | 25 |
| Minimum percent of germ | 15 |
| Maximum percent of germ | 50 |

*Germ meal mixture*

Germ meals from different units are combined to form germ meal mixture.

| | Per cent |
|---|---|
| Optimum percent germ meal from hard wheat | 33⅓ |
| Minimum percent germ meal from hard wheat | 25 |
| Maximum percent germ meal from hard wheat | 45 |

Remainder from hard white and/or soft wheats

| | Per cent |
|---|---|
| Optimum percent germ meal mixture in germ flour mixture | 17 |
| Minimum percent germ meal mixture in germ flour mixture | 4 |
| Maximum percent germ meal mixture in germ flour mixture | 24 |

Concentrate

A pre-mixed combination of—

| | Per cent |
|---|---|
| Wheat flour | 94.7 |
| Potassium bromate | 0.3 |
| Malted wheat flour | 5.0 |

| | Per cent |
|---|---|
| Optimum percent used in germ flour mixture | 1.0 |
| Minimum percent used in germ flour mixture | 0.5 |
| Maximum percent used in germ flour mixture | 1.5 |

It will be understood that the products need not come from all four mill units, but may come from one or more of said units.

Referring to the drawing in Fig. 2: In Figure 1 the combining of various products from four different milling units was illustrated, while here the combining of the products where only a single milling unit is available, is illustrated.

The gluten of the flour constitutes that elastic cellular medium, which is necessary in the dough to permit the expansion of the dough, which expansion in turn is induced by the gas producing agents. Manifestly, the lightness of bread is primarily dependent upon the character of the gluten, and hence the proper conditioning of all factors which affect the gluten is fundamentally and extremely important in bread making. The elasticity and tenacity of the gluten varies greatly with the various wheats and even with the same variety of wheat when grown in different soils and under different climatic conditions. On the one hand, the gluten must not be too stiffly elastic (too resistant to the expansion forces), and on the other hand it must not be too weakly elastic (too readily broken down, so that the gas has no enveloping medium for retaining the gas necessary in rendering the bread light).

Ordinary flour, such as flour from the endosperm, contains various enzymes. With the addition of the wheat germ in a percentage exceeding that in the wheat which would be required to make the percentage of said patent flour present in our wheat product, the introduction of enzymes is very, very, greatly increased. Also, the addition of the bran greatly increases the introduction of enzymes. Thus, the quantity of enzymes is so greatly augmented that an aggravated condition results which must receive special attention in order to have the flour provide factors which will meet the exacting demands of baking requirements generally and especially commercial baking requirements. Certain of these enzymes work upon the starches and tend to increase the gassing power of the flour, such as those called diastase. Other enzymes work upon the proteins, such as the proteinase. This action upon the proteins is beneficial to a certain extent in most types of flour because some breakdown or some softening of the gluten is desirable. To a certain extent this is similar to the action occurring at one of the stages of preparing the dough for baking, viz., that of ageing the dough or fermentation process, too much of which becomes very undesirable. Thus, while it is desirable on the one hand to add the wheat germ to provide the increased mineral and vitamin content, on the other hand there are thus introduced factors which must be definitely controlled or serious objection results. The wheat germ contains enzymes and an activator agent for the enzyme activity. Thus, in our experimentation we have discovered that before we could take advantage of the addition of the wheat germ, means of properly controlling the activator agents and the enzymes was necessary.

Accordingly, the catalytic activity of the enzymes aggravated positively by the addition of the wheat germ had to be carefully adjusted to the effect upon the all-important factor—the elasticity of the gluten. It will be understood that there may be present naturally a proteolytic enzyme activator in the ordinary endosperm flour, but not ordinarily in such quantity as to present difficulties in common baking practice. Such enzyme activator is present in whole wheat flour and is present in an objectionable quantity. This feature contributes to the difficulty of providing whole wheat bread in other than compact loaves. Such compactness of loaf, it is submitted, accounts for the limited use of whole wheat bread. However, the wheat germ which is added tends to increase many, many fold the supply of the activator. After extended experimentation, our discovery has resulted in providing a wheat product capable of making baked products, such as bread and the like, having a superior flavor and being far richer in vitamins B, E, and G found in the wheat than are present in either white flour or whole-wheat flour, i. e., in excess of any bread prior to our invention which is commercially acceptable.

Little is known of the chemistry of the enzymes. Our experimentation indicates that wheat germ which is added tends to increase the supply of the activator, which does increase the proteolytic enzyme activity. We have sought to control or destroy or lessen the effect of this activator. It is a part of our discovery that the physical and chemical characteristics of the proteins in the flour are mainly responsible as the elements which may be subjected to control. Our experiments have developed the fact that by the addition of what we herein call an "enzyme and activator control agent" we are enabled to regulate the enzyme activity. The term "enzyme and activator control agent" as herein used, both in the specification and the claims, may be defined, as the result of our experimentation, as including oxidizing agents in the form of bromate, iodate, or persulfate and/or inactivators such as ascorbic acid and dehydroascorbic acid. The "enzyme and activator control agent" which we preferably employ is potassium bromate. Accordingly, with the aid of these "enzyme and activator control agents" we can provide a product which will meet the exacting requirements of the baking trade. We preferably introduce the potassium bromate as one part of the pre-mixed combination which is referred to herein as a "concentrate." This concentrate may consist of:

| | Percent |
|---|---|
| Wheat flour | 94.7 |
| Potassium bromate, etc | 0.3 |
| Malted wheat flour | 5.0 |

The essential part of this concentrate is the "enzyme and activator control agent." In the preferred mixture given, this "control agent" is potassium bromate, which, according to our experimentation, we have discovered to give the best results. While the preferred form of the concentrate mixture includes wheat flour and malted wheat flour, these are not necessary. By forming a mixture indicated as the preferred mixture, the small amount of "enzyme and activator control agent" may be more readily and uniformly distributed. The malted wheat flour is added to insure the presence of the desired quantity of those enzymes called diastase, which work upon the starches. In careful milling of wheat flour it is common practice to carefully control the diastatic character of the flour and hence the malted wheat flour in the concentrate is only added to insure the presence of sufficient quantity of such enzymes, but it is obvious that the same might be supplied by adjusting this feature of the white flour.

Of the concentrate combination or mixture, we find that an optimum percent may be used in our wheat product of 1.0%; a minimum percent to be used in our product of 0.5%, and a maximum percent to be used in our product of 1.5%. When a less percent than 0.5% is used, the disadvantageous results are revealed as follows: Optimum percentage 1.0% supplies a loaf volume of 148 cubic inches—a one pound loaf standard. If less than 0.5% is employed, the volume of the loaf is below standard. For example, if 0.3% is employed, the loaf has only 123 cubic inches.

When a greater amount than 1.5% is used, our experiments show that the fermentation is upset and a volume of loaf below the standard is the result. For example, if 2.0% is employed the loaf has only 135 cubic inches. The small amount of "enzyme and activator control agent" employed is one of the reasons why we prefer to introduce it along with the other parts of said "concentrate." In this manner the "enzyme and activator control agent" may more readily be uniformly intermixed with the other ingredients of the wheat product.

In preparing our wheat product our experiments show that a certain type of wheat flour especially matured and aged is preferable. What is meant by this certain type of flour will next be considered. In the ordinary art of baking when wheat meal (such as whole wheat or graham) is added to white flour, the effective gluten percentage is reduced and accordingly it was the practice to add a white flour of a character having an extra high protein content which would provide the additional strong gluten to make up for the wheat meal. Accordingly, in our experimentation we initially tried this ordinary teaching of the art and employed flour of a strong protein content. However, we found that this did not hold true in our wheat product and that a more satisfactory result was obtained in the product of our invention when white flour with average protein content and a more mellow type of gluten was employed.

For optimum results the optimum percent of said preferred type of what flour, specially matured and aged, which may be employed in germ flour mixture is 82%. The minimum percent in germ flour mixture is 75%, the maximum percent in germ flour mixture is 95%. This wheat flour may be made on one mill only or a combination of two or more, i. e., a blend may be employed.

The germ meal (see Fig. 1) is separated out and comprises inner bran, and germ, and in the preferred formula an optimum percent of germ in the germ meal is 25%; a minimum percent germ in the germ meal is 15%; and a maximum percent of germ in the germ meal is 50%.

If a wheat product embodying our invention is to be comprised of as much as 95% of wheat flour, then to have the excess of germ present, which feature characterizes our invention, it would obviously be necessary to add a substantially pure germ instead of germ meal. In any event, the percentage of germ present would be at least 4% of the total mixture in order to insure such excess of wheat germ over that which otherwise is in the wheat from which the wheat flour present was made.

The germ meal mixture is preferably formed from germ meals from several varieties of wheats to provide best flavor, texture and crumb characteristics, but this is not necessary to provide a good, though not the best product. An optimum percent of germ meal from hard wheat is 33⅓%; a minimum percent germ meal from hard wheat is 25%; and a maximum percent germ meal from hard wheat is 45%. The remainder should be from hard white and/or soft wheats. An optimum percent of germ meal mixture in germ flour mixture is 17%; a minimum percent germ meal mixture in germ flour mixture is 4%; and a maximum percent germ meal mixture in germ flour mixture is 24%. These percentages give the best results, but germ meal mixture may be made from either hard or soft wheat without blending with somewhat less favorable results. Our experiments show the effect upon the volume of the loaf of the addition of pure wheat germ to wheat flour to be as follows, i. e., a wheat flour producing a normal 148 cubic inch volume loaf, in general will be affected as follows:

| Wheat flour | 100% | 95% | 90% | 85% |
|---|---|---|---|---|
| Pure wheat germ | 0% | 5% | 10% | 15% |
| Cu. inch volume | 148 | 131 | 117 | 98 |

According to our experimentation, if one departs from the 82% of the patent flour content either way, there is a failure to obtain the combination of flavor and other advantageous baking properties, and of course in the degree that more than 82% is employed of the patent flour then the lessened quantity of minerals and vitamins will be available which are found in the added germ meal.

The varying of the percentage of the various ingredients (wheat flour, germ meal mixture and concentrate) has the effect of varying the volume of the loaf, color, texture and flavor as set forth in the following table:

| | Volume | Color | Texture | Flavor |
|---|---|---|---|---|
| | Cubic inches | | | |
| 82% wheat flour 17% germ meal mixture 1% concentrate | 148 | Std | Std | Excellent or superior. |
| 75% wheat flour 24% germ meal mixture 1% concentrate | 133 | Dark | Std | Strong. |
| 90% wheat flour 9% germ meal mixture 1% concentrate | 146 | Too light | Sdt | Not wheaty |

Our product has met the test of production on commercial scale and this over a period of several months, and also has met the test of the baking requirements and has met the approval of the trade and consumer.

We claim:

1. A ground wheat product in a dry form comprising a mixture of raw wheat germ and bran, said mixture constituting 4% to 17% of the final product and said raw wheat germ constituting a greater percentage of the final product than the percentage present in wheat; a second mixture of potassium bromate intimately intermixed with wheat flour and malted wheat flour, said second mixture constituting .5% to 1.5% of the final product and said potassium bromate constituting .0015% to .0045% of the final product; and wheat flour constituting substantially the balance of the final product intimately intermixed with and enveloping said raw germ and said potassium bromate, whereby a wheat product in a dry form is provided characterized by remaining free from rancidity for relatively long periods of time.

2. A method of making a ground wheat product in dry form comprising the steps of (a) forming a first mixture of inner bran, and raw wheat germ from hard wheat having wheat germ present in the range of 15% to 50% of said mixture; (b) forming a second mixture of germ meal of inner bran, and raw wheat germ from soft wheat having wheat germ present in the range of 15% to 50% of said mixture; (c) forming a third mixture comprising one-third of the germ meal from said first mixture and two-thirds from the germ meal from the said second mixture; (d) forming a fourth mixture comprising potassium bromate of about 0.3%, malted wheat flour of about 5.0%, and wheat flour to complete the balance of the mixture; and (e) forming the final mixture having said third mixture present in the range of 4% to 24%, the fourth mixture present in the range of 0.5% to 1.5%, and adding wheat flour of reduced proteolytic activity to these to constitute 100%.

3. A ground wheat product in a dry form comprising raw wheat germ, said wheat germ being present in a percentage exceeding that in the wheat employed in making the wheat flour constituent hereof; potassium bromate in the range of 0.0015% to 0.0045%; and wheat flour in the range of 96 to 88%.

ORIN WALLACE FISHER.
ARTHUR J. KING.
WILLIAM L. HALEY.